S. S. COLT.
MOLDING APPARATUS.
APPLICATION FILED FEB. 9, 1918.

1,293,344.

Patented Feb. 4, 1919.
4 SHEETS—SHEET 1.

WITNESSES:
Fredk H. W. Fraentzel
Eva E. Desch

INVENTOR:
Samuel S. Colt,
BY
Fraentzel and Richards
ATTORNEYS.

S. S. COLT.
MOLDING APPARATUS.
APPLICATION FILED FEB. 9, 1918.

1,293,344.

Patented Feb. 4, 1919.
4 SHEETS—SHEET 2.

WITNESSES:
Fredk. H. W. Fraentzel
Eva E. Desch

INVENTOR:
Samuel S. Colt,
BY
Fraentzel and Richards
ATTORNEYS

S. S. COLT.
MOLDING APPARATUS.
APPLICATION FILED FEB. 9, 1918.

1,293,344.

Patented Feb. 4, 1919.
4 SHEETS—SHEET 3.

WITNESSES:
Fred'k H. W. Fraentzel
Eva E. Desch

INVENTOR:
Samuel S. Colt
BY
Fraentzel and Richards
ATTORNEYS.

S. S. COLT.
MOLDING APPARATUS.
APPLICATION FILED FEB. 9, 1918.
1,293,344.
Patented Feb. 4, 1919.
4 SHEETS—SHEET 4.
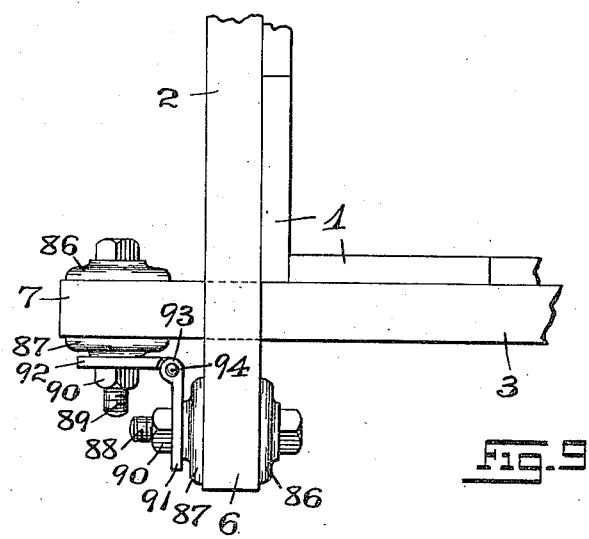
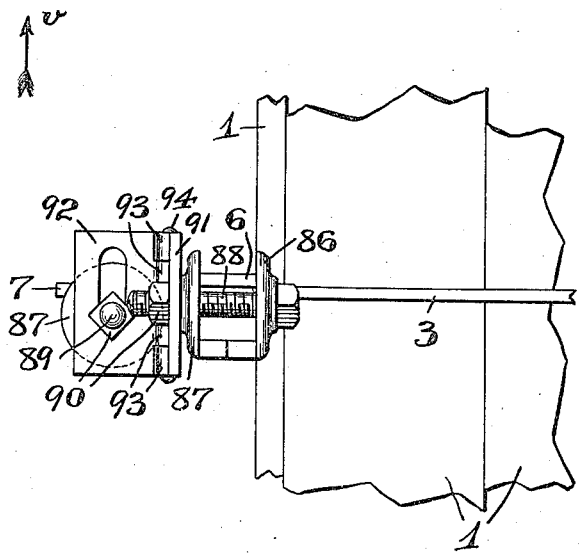

UNITED STATES PATENT OFFICE.

SAMUEL S. COLT, OF ORANGE, NEW JERSEY.

MOLDING APPARATUS.

1,293,344.   Specification of Letters Patent.   Patented Feb. 4, 1919.

Application filed February 9, 1918. Serial No. 216,158.

*To all whom it may concern:*

Be it known that I, SAMUEL S. COLT, a citizen of the United States, residing at Orange, in the county of Essex and State of New Jersey, have invented certain new and useful Improvements in Molding Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in concrete construction, and has reference, more particularly, to improved devices to be used with the cribbing and retaining members or elements to provide a form for producing the concrete structure, as a wall or the like.

The present invention has for its principal objects to produce a simple form and novel devices therefor for detachably connecting the cribbing-boards to a retaining member or members, for maintaining reinforcing rods in fixed position when such rods are used, devices for holding the retaining members in crossed relations at the angles or corners of the wall to be produced, and finally to provide tying means which can be removed from the poured structure, without leaving a hole or holes extending laterally from one face of the wall to the other face thereof.

The invention has for its further object to provide a novel fixing and tying means for the proper adjustment and disposition of the mold-boards or cribbing members so as to properly aline said boards or sections with relation to one another to produce a smooth-faced wall or structure and one of uniform thickness.

Other objects of the present invention not at this time more particularly enumerated will be clearly understood from the following detailed description of the said invention.

With the various objects of the present invention in view, the said invention consists, primarily, in the novel arrangements and combinations of the various devices and parts, as well as in the detailed construction of the individual devices, all of which will be more fully described in the following specification, and then finally embodied in the clauses of the claim which are appended to and which form an essential part of the said specification.

The invention is clearly illustrated in the accompanying drawings, in which:—

Fig. 9 is a plan view of the crossed end-portions of two retaining members and another modified clamping device for securing said retaining members in their clamped relation; and Fig. 10 is a view of the same, looking in the direction of the arrow $v$ in said Fig. 9.

Similar characters of reference are employed in all of the said above described views, to indicate corresponding parts.

Figure 1:
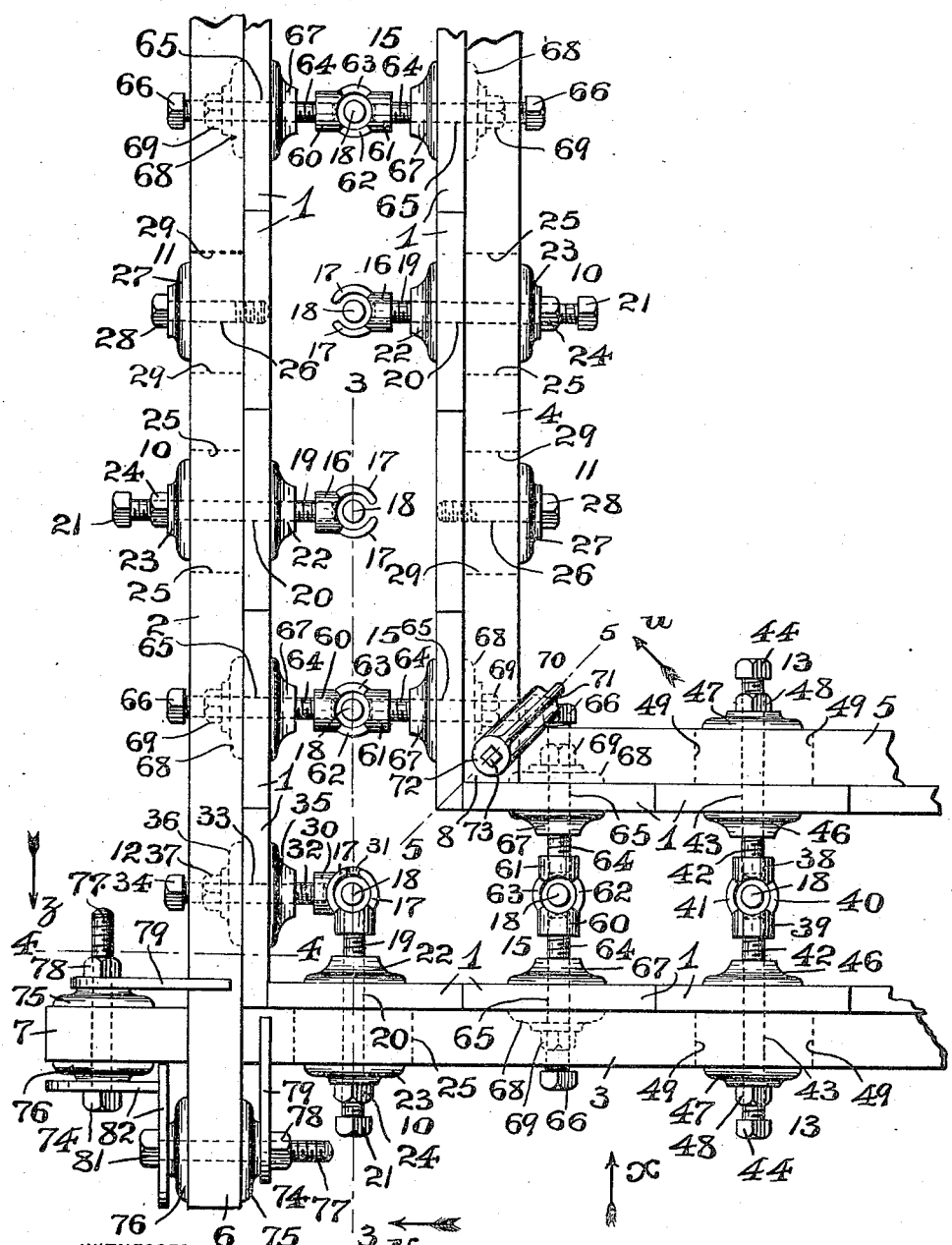
Figure 1 is a top or plan view of a molding form and the various devices employed in connection therewith and embodying the principles of the present invention, said view showing the angle or corner of a wall to be made in said form.
Figure 2:
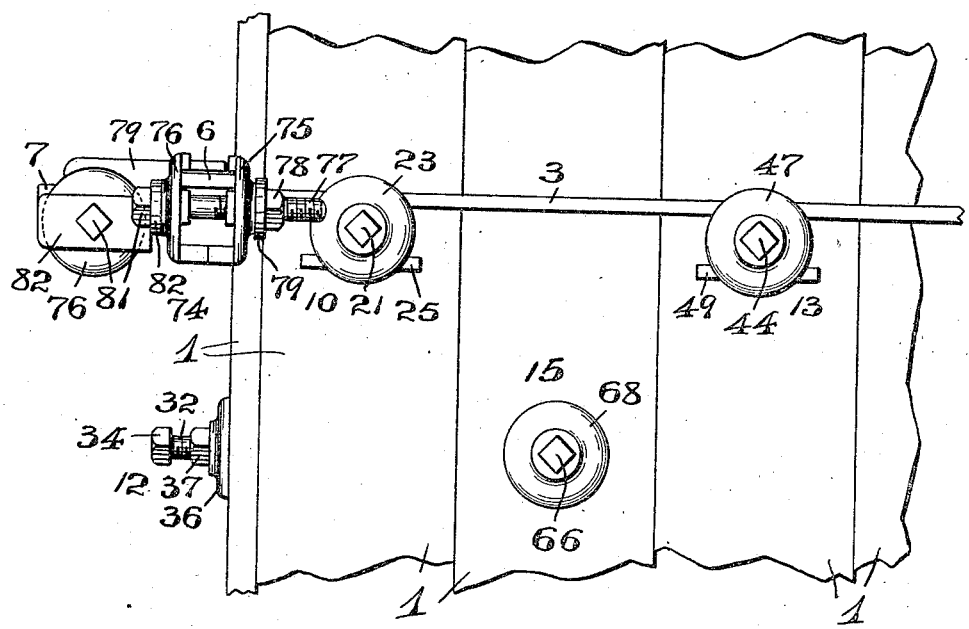
Fig. 2 is a face view of the said form, looking in the direction of the arrows $x$ in said Fig. 1.
Figure 3:
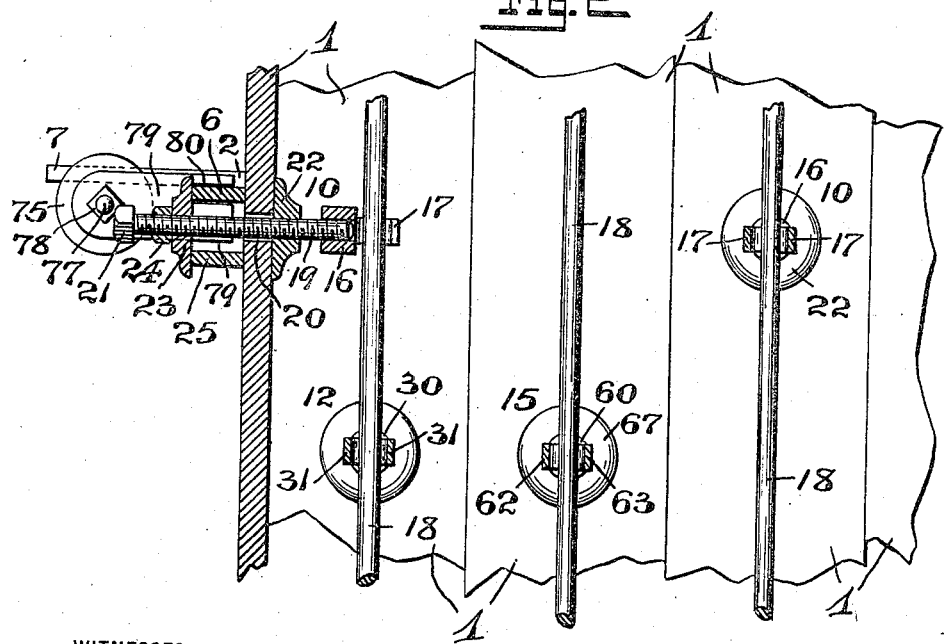
Fig. 3 is a vertical sectional representation of the same, said section being taken on line 3—3 in said Fig. 1, looking in the direction of the arrow $y$.

Referring now to the several figures of the drawings, the reference-character 1 indicates a plurality of usually vertically disposed cribbing-boards or sections, and the reference-characters 2, 3, 4 and 5 indicate suitably placed and horizontally disposed retaining members or elements which may be of wood or metal. At the angles or corners the respective retaining members or elements 2 and 3 overlap, as at 6 and 7, and the respective retaining members or elements 4 and 5 overlap, as at 8 and 9, as will be evident from an inspection of the several figures of the drawings.

In starting to build the wall or other structure of concrete, or other similar material, the cribbing boards or sections 1 are vertically and oppositely disposed, the several retaining members or elements are horizontally disposed upon the outer surfaces of the said vertical cribbing boards or sections and suitably secured in their clamped relations by means of the devices 10, 11 and 12, or by the modified devices 13 and 14. Proper spacing between the set-up cribbing boards or sections 1 is accomplished by an arrangement of spacing devices 15, or by means of the previously-mentioned combined set-up and spacing devices 13 and 14, all of which will be clearly understood from an inspection of Figs. 1 and 8 of the drawings.

Referring to the clamping devices indicated by the reference-character 10, each device comprises an internally screw-threaded hub, as 16, provided with suitably shaped retaining fingers or members 17 of arc-shaped configuration which are arranged so as to loosely embrace the vertically disposed reinforcing rods 18 to retain said rods in their vertical positions, prior to pouring the concrete-mixture, as will be clearly evident.

Screwed into the internally screw-threaded portion of the said hub 16 is the screw-threaded end-portion of a rod or bolt 19, said rod or bolt 19 extending through a hole or perforation 20 in the cribbing board or section 1, and being provided upon its outer end-portion with a nut-shaped head 21, or other suitable means for adjustment of the said rod or bolt 20, or the removal of its screw-threaded end-portion from the hub 16 at the proper time and for the purposes hereinafter stated. Adjustably disposed upon the screw-threaded shank of the said rod or bolt 19 are a pair of screw-threaded clamping plates or disks 22 and 23, one of which, as 22, is screwed up against the inner face of the cribbing board or section 1, and the other plate or disk 23 being screwed up against the edge of the retaining member 2, 3, 4 or 5, as the case may be. To bring the said parts in their positively clamped relation, the rod or bolt 18 may have arranged thereon a lock-nut 24 which can be screwed tightly down upon the disk or plate 23 and to maintain the proper alinement and to prevent distortion, a regulating plate or block 25 is usually placed between the clamping face of the disk or plate 23 and the cribbing board or section 1. If desired, these clamping devices 10 may be used with all of the cribbing boards or sections 1 and the said retaining members or elements 2, 3, 4 and 5, but in order to avoid additional expense some of the cribbing boards or sections 1 may be brought into clamped relation with the horizontally disposed retaining members or elements by means of the devices 11, comprising merely a bolt, as 26, which is screwed into the cribbing board 1 and has a washer or disk 27 forced into clamped engagement with the edge of the retaining member by means of the head 28 of said bolt 26, as will be clearly understood from an inspection of said Fig. 1 of the drawings. In addition a regulating block or plate 29 may also be used with said bolt 26 and washer or disk 27.

The device indicated generally by the reference-character 12 is merely a reinforcing rod retaining means, used in connection only with a cribbing board or section, and the same consists, essentially, of an internally screw-threaded hub 30 provided with arc-shaped retaining fingers or members 31 which are arranged so as to loosely embrace a vertically disposed reinforcing rod 18 for the purpose hereinbefore stated. Screwed into the internally screw-threaded portion of said hub 30 is the screw-threaded end portion of a rod or bolt 32 extending through a hole 23 in the cribbing board or section 1, and being provided upon its outer end-portion with a nut-shaped head 34, or other suitable means for adjustment of the said rod or bolt, or for removal of its screw-threaded end-portion from the hub 30 at the proper time, and for the purposes hereinafter more fully stated.

Adjustably disposed upon the screw-threaded shank of the said rod or bolt 32 are a pair of screw-threaded clamping plates or disks 35 and 36, adapted to be screwed up tightly against the opposite faces of the cribbing board or section 1. A lock-nut 37 may also be employed with said rod or bolt, said nut being adapted to be screwed against the said plate or disk 36 for tightening purposes, as will be evident.

In addition to the said devices 10, 11 and 12, or if desired, in lieu thereof, devices 13 may be employed, consisting, essentially, of a pair of internally screw-threaded tubular or hub-like members, as 38 and 39, connected by means of the arc-shaped members 40 and 41 arranged so as to loosely embrace the vertically disposed reinforcing rods 18 to retain said rods in their vertical position, prior to pouring the concrete-mixture. Screwed into the internally screw-threaded portions of the respective tubular or hub-like members 38 and 39 are the screw-threaded end-portions of a pair of oppositely projecting rods or bolts 42 which extend into and through holes or perforations 43 located in the oppositely disposed cribbing boards or sections 1, and each bolt being provided upon its outer end-portion with a nut-shaped head 44, or other suitable means for adjustment of the said rods or bolts, or for the removal of their screw-threaded end-portions from said tubular or hub-like members 38 and 39 at the proper time and for the purposes hereinafter stated.

In this construction also there are adjustably disposed upon the screw-threaded shanks of the said rods or bolts 42 screw-threaded clamping plates or disks 46 and 47, the disks or plates 46 being screwed up against the inner faces of the oppositely placed cribbing boards or sections 1, the other plates or disks 47 being screwed up against the edges, as shown in Fig. 1, of the retaining members 3 and 5. Lock-nuts 48 may also be mounted upon the screw-threaded shanks of said rods or bolts 42, and to maintain the proper alinement and to prevent distortion of the said parts, when tightened, regulating plates or blocks 49 may be placed between the clamping faces of the said disks or plates 47 and the outer faces of the cribbing-boards or sections 1.

Figure 8:
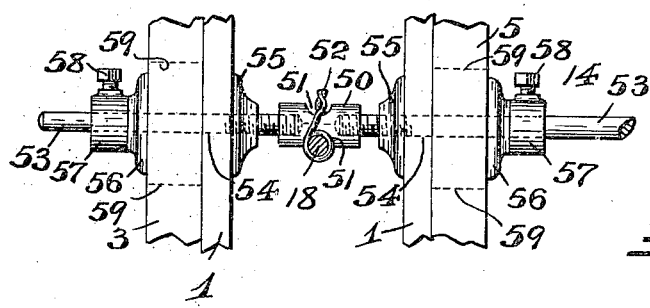
Fig. 8 is a top view of fragmentary portions of oppositely placed cribbing boards and retaining members, showing in connection therewith a modified spacing device and reinforcing rod sustaining element.

In lieu of the devices 13 I may employ devices 14 of the character represented in Fig. 8 of the drawings. In this case the device consists, essentially, of an internally screw-threaded sleeve, as 50, formed with a depression 51 for arranging said sleeve against the side of a reinforcing rod 18 and into holding or retaining registration therewith, the parts being secured together by means of a wire 52, or other suitable binding or tightening means. Screwed into the screw-threaded portions of the said sleeve 50 are the screw-threaded end-portions of a pair of oppositely projecting rods 53 which extend into and through holes or perforations 54 located in the oppositely disposed cribbing boards or sections 1. Adjustably disposed upon the screw-threaded portions of said rods 53 are screw-threaded clamping plates or disks 55 adapted to be screwed up against the inner faces of the oppositely located cribbing boards. Also movably mounted upon said rods 53 are other plates or disks 56 adapted to be firmly brought against the edges of the retaining members or elements located upon the outer faces of said cribbing boards, said plates or disks 56 being adapted to be secured in their clamping relation by an arrangement of sleeves or collars 57 and tightening nuts 58 in a manner clearly evident from an inspection of said Fig. 8. To maintain the proper alinement and to prevent distortion of the said parts, when tightened, regulating plates or blocks 59 may be placed between the clamping faces of the said disks or plates 56 and the outer faces of the cribbing boards or sections 1.

While lateral bracing of the cribbing-boards or sections, and uniform spacing between the oppositely placed cribbing-boards or sections is readily accomplished by the use of the devices 13, such lateral bracing and uniform spacing, where the devices 10, 11 and 12 are employed, is usually accomplished by the use of the devices 15, arranged substantially as shown in Fig. 1 of the drawings.

Each device 15 consists, essentially, of a pair of internally screw-threaded tubular or hub-like members 60 and 61, connected by means of the arc-shaped members 62 and 63 arranged so as to loosely embrace the vertically disposed reinforcing rods 18 to retain said rods in their vertical positions, prior to pouring the concrete mixture. Screwed into the internally screw-threaded portions of the respective tubular or hub-like members 60 and 61 are the screw-threaded end-portions of a pair of oppositely projecting rods or bolts 64 which extend into and through perforations 65 located in the oppositely placed cribbing boards or sections 1, each bolt being provided upon its outer end-portion with a nut-shaped head 66, or other suitable means for adjustment of the said rods or bolts, or for the removal of their screw-threaded end-portions from said tubular or hub-like members 60 and 61 at the proper time and for the purposes hereinafter stated. Adjustably disposed upon the screw-threaded shanks of said rods or bolts 64 are screw-threaded clamping plates or disks 67 and 68, the disks being tightly screwed up against the respective inner and outer faces of the oppositely placed cribbing boards or sections 1. Lock-nuts 69 may also be mounted upon the screw-threaded shanks or bolts, said nuts 69 being tightly screwed up against the said clamping plates or disks 68, substantially as shown in said Fig. 1 of the drawings.

Figure 5:
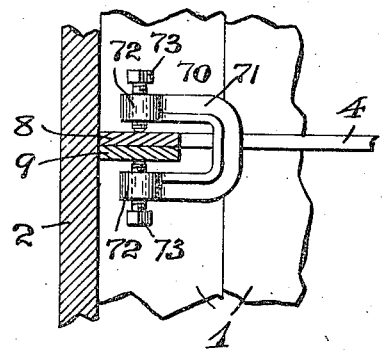
Fig. 5 is a detail vertical cross-section taken on line 5—5, looking in the direction of the arrow $u$.

At the angles or corners of the structure to be produced, where the several retaining members or elements overlap, the overlapping end-portions 8 and 9 of the members 4 and 5 may be brought into clamped relation by the clamping devices 70 shown in Figs. 1 and 5 of the drawings, comprising a yoke 71 formed with screw-threaded eyes 72, in each of which is arranged a tightening bolt or screw 73. The yoke 71 is arranged with relation to the overlapping end-portions 8 and 9, and when the bolts or screws 73 are screwed up tight, the said end-portions will be firmly clamped, as will be clearly evident.

Figure 4:
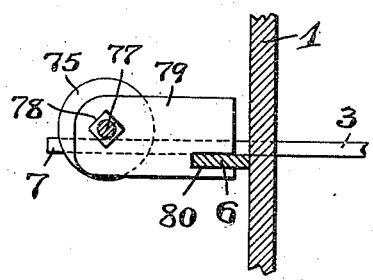
Fig. 4 is a detail vertical cross-section taken on line 4—4 in said Fig. 1, looking in the direction of the arrow $z$.

The overlapping end portions 6 and 7 of the retaining members or elements 2 and 3 may be brought into their clamped overlapping relation by an arrangement of the devices 74, as represented in Fig. 1 of the drawings. Said devices, as will be seen from said Fig. 1 and from Fig. 4, comprise a pair of perforated clamping disks or plates 75 and 76, mounted upon tightening bolts 77. Mounted upon said bolts, between the disks or plates 75 and tightening nuts 78 upon the screw-threaded shank of each bolt are plates, as 79, said plates having slotted portions 80, by means of which said plates may be brought into holding and retaining engagement with the respective retaining members or elements 2 and 3, substantially as shown. Also mounted upon said bolts, between the heads 81 thereof and the disks or plates 76 are regulating plates, as 82. The various parts when arranged in the manner shown in said Fig. 1, will readily secure the overlapping end-portions 6 and 7 of the members 2 and 3, rigidly in the relation shown.

Figure 6:
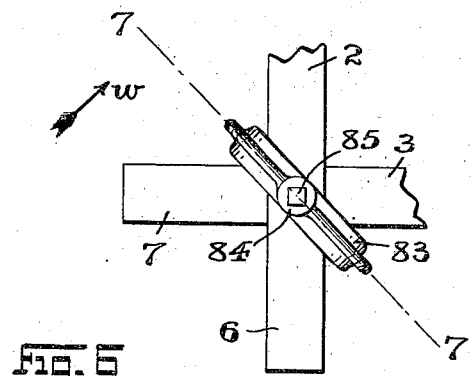
Fig. 6 is a top or plan view of the crossed end-portions of two retaining members and a modified clamping device for securing said retaining members in their clamped relation.
Figure 7:
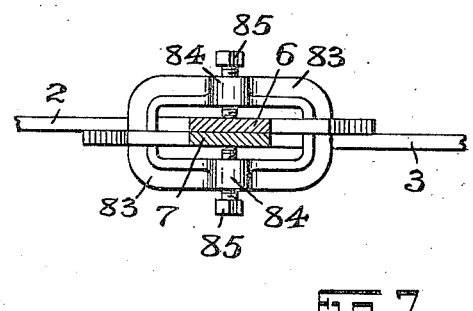
Fig. 7 is a cross-section of the same, said section being taken on line 7—7 in said Fig. 6, looking in the direction of the arrow $w$, with the clamping device shown in elevation.

In lieu of the devices 74, a yoke-shaped element, such as is shown in Figs. 6 and 7 of the drawings may be employed for securing the overlapping end-portions 6 and 7 of the retaining members or elements 2 and 3 securely in their clamped relation. In this case the clamping device consists, essentially of an oval and ring-shaped element, as 83, formed with screw-threaded eye-portions 84 in each of which is mounted a tightening bolt or screw 85. The manner of arranging this clamping device about the overlapping end-portions of the retaining members or elements 2 and 3, and securing the parts in their rigidly clamped relation by means of said bolts or screws 85 will be clearly understood from an inspection of said Fig. 7 of the drawings, and any further description of the same will therefore be unnecessary.

Instead of the devices 74 for clamping the overlapping end-portions 6 and 7 of the retaining members 2 and 3, I may use the devices illustrated in Figs. 9 and 10 of the drawings. Said devices comprise a pair of perforated clamping disks 86 and 87 mounted upon tightening bolts 88 and 89, as shown. Mounted upon the respective bolts 88 and 89, between tightening nuts 90 upon each bolt and the respective disks 87 are a pair of plates, as 91 and 92, said plates being pivotally connected by means of pivot-ears 93 and a pintle 94, the parts readily adapting themselves to any angular relation of the said overlapping portions 6 and 7, whether a right angle, acute, or an obtuse angle, as will be clearly evident.

Having by means of the various devices hereinbefore described properly brought the vertically disposed cribbing members or elements and the various horizontally disposed retaining members or elements in their secured relation, and having also made the proper adjustments to provide a desired and a uniform mold-width, the concrete-mixture, or wall or structure to be produced is built directly about the various parts of the devices which are located directly within the space between the oppositely located cribbing-boards or sections. After the mixture has set sufficiently, the various bolts 10, 26, 32, 42 and 64 are unscrewed from the respective hub-like or tubular members 16, 30, 38 and 60, or the bolts 26 from the boards 1, or the rods 53 from the tubular members 51, as the case may be, and are, with the various tightening nuts 24, 34, 48, 66, (or the collars 57 on said rods 53,) and the clamping disks or plates 23, 36, 47, 68, or 56, entirely removed, so that the various retaining members or elements 2, 3, 4 and 5, and the several cribbing boards or sections 1 taken down and removed for future use in the building of another wall or other structure. After removal of the cribbing-boards or sections 1, the clamping disks or plates 22, 35, 46, 67, or 56 from which the various bolts or rods were removed, and which disks or plates were thereby left in the faces of the wall-structure, are also removed or picked out of the said faces, the various hub-like or tubular members being left within the cement-body or other material in which they become embedded. The result is that the central portions of the wall or other structure are thus left solid, thereby adding considerably to the strength of the wall or structure, as will be clearly evident. The open portions in the faces of the wall or structure left by the removal of the various bolts or rods and clamping disks or plates are closed with fresh concrete or cement to provide a finished face.

From the foregoing description it will be seen, that I have produced a very simple and operative construction of cribbing or mold-form for forming therein a wall, or for producing any other desired structure of concrete or similar material, the form being readily capable of adjustment, alinement and variation, so as to be able to produce with the same devices and parts, forms and walls of any desired widths, the cribbing or form being easily and quickly erected and readily adjusted; and, at the same time, the cribbing or form is just as quickly knocked down or dismantled when the wall or other structure has been completed, to be stored away for further use in the erection of another wall or structure.

I am fully aware that changes may be made in the general arrangements and combinations of the various devices and parts, as well as in the details of the construction of the said parts, without departing from the scope of the present invention as set forth in the foregoing specification and as defined in the clauses of the claim which are appended to the said specification. Hence, I do not limit my present invention to the exact arrangements and combinations of the several devices and parts as described in the foregoing specification, nor do I confine myself to the exact details of the construction of the said parts as illustrated in the accompanying drawings.

I claim:—

1. A knock-down form or cribbing for use in the erection of concrete and similar structures comprising cribbing boards, retaining elements adapted to be placed against the outside of said boards, and clamping devices comprising internally screw-threaded elements adapted to be embedded in the concrete, or the like, screw-threaded rods removably connected with said screw-threaded elements, reinforcing rod-embracing members connected with and extending from said internally screw-threaded elements so as to embrace said reinforcing rods, and clamping means upon said rods adapted to be brought into clamped relations with the cribbing boards and the retaining elements.

2. A knock-down form or cribbing for use in the erection of concrete and similar structures comprising cribbing boards, retaining elements adapted to be placed against the outside of said boards, and clamping devices comprising internally screw-threaded elements adapted to be embedded in the concrete, or the like, screw-threaded rods removably connected with said screw-threaded elements, reinforcing rod-embracing members connected with and extending from said internally screw-threaded elements so as to embrace said reinforcing rods, screw-threaded clamping plates movably disposed upon said rods and adapted to be brought into clamped relations with the cribbing boards and retaining elements, and lock-nuts upon said rods.

3. A knock-down form or cribbing for use in the erection of concrete and similar structures comprising cribbing boards, retaining elements adapted to be placed against the outside of said boards, and clamping devices comprising internally screw-threaded elements adapted to be embedded in the concrete, or the like, screw-threaded rods removably connected with said screw-threaded-elements, and reinforcing rod embracing members connected with and extending from said internally screw-threaded elements to embrace said reinforcing rods.

4. A knock-down form or cribbing for use in the erection of concrete and similar structures comprising cribbing boards, retaining elements adapted to be placed against the outside of said boards, and clamping devices comprising internally screw-threaded elements adapted to be embedded in the concrete, or the like, screw-threaded rods removably connected with said screw-threaded elements, screw-threaded clamping plates movably disposed upon said rods and adapted to be brought into clamped relations with the cribbing boards and retaining elements, lock-nuts upon said rods, and reinforcing rod embracing members connected with and extending from said internally screw-threaded elements to embrace said reinforcing rods.

5. A knock-down form or cribbing for use in the erection of concrete and similar structures comprising cribbing boards, and spacing devices comprising internally screw-threaded elements adapted to be embedded in the concrete, or the like, screw-threaded rods removably connected with said screw-threaded elements, clamping means upon said rods adapted to be brought into clamped relations with the cribbing boards, and reinforcing rod embracing members connected with and extending from said internally screw-threaded elements to embrace said reinforcing rods.

6. A knock-down form or cribbing for use in the erection of concrete and similar structures comprising cribbing boards, and spacing devices comprising internally screw-threaded elements adapted to be embedded in the concrete, or the like, screw-threaded rods removably connected with said screw-threaded elements, screw-threaded clamping plates movably disposed upon said rods and adapted to be brought into clamped relations with the cribbing boards, and reinforcing rod embracing members connected with and extending from said internally screw-threaded elements to embrace said reinforcing rods.

7. A knock-down form or cribbing for use in the erection of concrete and similar structures comprising cribbing boards, overlapping retaining elements adapted to be placed against the outside of said boards, said retaining elements having their overlapping portions angularly disposed with relation to each other, and clamping devices detachably connected with and embracing the said overlapping portions.

8. A knock-down form or cribbing for use in the erection of concrete and similar structures comprising cribbing boards, overlapping retaining elements adapted to be placed against the outside of said boards, said retaining elements having their overlapping portions angularly disposed with relation to each other, and oval shaped clamping devices detachably connected with said overlapping portions, consisting of oppositely disposed receiving members adapted to embrace said overlapping portions of the retaining members and formed with screw-threaded eyes, and tightening bolts in said eyes.

9. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of yoke-shaped receiving members formed with screw-threaded eyes, and tightening bolts in said eyes, combined with clamping devices comprising internally screw-threaded elements adapted to be embedded in the concrete or the like, screw-threaded rods removably connected with said screw-threaded elements, and clamping means upon said rods adapted to be brought into clamped relations with the cribbing boards and the retaining elements.

10. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of tightening bolts, clamping disks movably mounted upon said bolts, and plate-like members provided with receiving slots for engagement with said retaining members, combined with clamping devices comprising internally screw-threaded elements adapted to be embedded in the concrete or the like, screw-threaded rods removably connected with said screw-threaded elements, and clamping means upon said rods adapted to be brought into clamped relations with the cribbing boards and the retaining elements.

11. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, combined with clamping devices comprising internally screw-threaded elements adapted to be embedded in the concrete or the like, screw-threaded rods removably connected with said screw-threaded elements, screw-threaded clamping plates movably disposed upon said rods and adapted to be brought into clamped relations with the cribbing boards and retaining elements, and lock-nuts upon said rods.

12. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of yoke-shaped receiving members formed with screw-threaded eyes, and tightening bolts in said eyes, combined with clamping devices comprising internally screw-threaded elements adapted to be embedded in the concrete or the like, screw-threaded rods removably connected with said screw-threaded elements, screw-threaded clamping plates movably disposed upon said rods and adapted to be brought into clamped relations with the cribbing boards and retaining elements, and lock-nuts upon said rods.

13. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of tightening bolts, clamping devices movably mounted upon said bolts, and plate-like members provided with receiving slots for engagement with said retaining members, combined with clamping devices comprising internally screw-threaded elements adapted to be embedded in the concrete or the like, screw-threaded rods removably connected with said screw-threaded elements, screw-threaded clamping plates movably disposed upon said rods and adapted to be brought into clamped relations with the cribbing boards and retaining elements, and lock-nuts upon said rods.

14. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, combined with spacing devices comprising internally screw-threaded elements adapted to be embedded in the concrete, or the like, screw-threaded rods removably connected with said screw-threaded elements, and clamping means upon said rods adapted to be brought into clamped relations with the cribbing boards.

15. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of yoke-shaped receiving members formed with screw-threaded eyes, and tightening bolts in said eyes, combined with spacing devices comprising internally screw-threaded elements adapted to be embedded in the concrete, or the like, screw-threaded rods removably connected with said screw-threaded elements, and clamping means upon said rods adapted to be brought into clamped relations with the cribbing boards.

16. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of tightening bolts, clamping disks movably mounted upon said bolts, and plate-like members provided with receiving slots for engagement with said retaining members, combined with spacing devices comprising internally screw-threaded elements adapted to be embedded in the concrete, or the like, screw-threaded rods removably connected with said screw-threaded elements, and clamping means upon said rods adapted to be brought into clamped relations with the cribbing boards.

17. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, combined with spacing devices comprising internally screw-threaded elements adapted to be embedded in the concrete, or the like, screw-threaded rods removably connected with said screw-threaded elements, and screw-threaded clamping plates movably disposed upon said rods and adapted to be brought into clamped relations with said cribbing boards.

18. A knock-down form or cribbing for use in the erection of concrete and similar structures comprising cribbing boards, retaining elements adapted to be placed against the outside of said boards, said retaining elements having overlapping portions, and clamping devices detachably connected with said overlapping portions, consisting of yoke-shaped receiving members formed with screw-threaded eyes, and tightening bolts in said eyes, combined with spacing devices comprising internally screw-threaded elements adapted to be embedded in the concrete, or the like, screw-threaded rods removably connected with said screw-threaded elements, and screw-threaded clamping plates movably disposed upon said rods and adapted to be brought into clamped relations with said cribbing boards.

19. In combination with a knockdown form or cribbing, clamping devices comprising rod-receiving elements adapted to be embedded in the concrete, or the like, rods removably connected with said elements, reinforcing rod-embracing members connected with and extending from said rod-receiving elements so as to embrace said reinforcing rods, and means upon said removable rods adapted to be brought into retaining engagement with the form or cribbing.

20. In combination with a knock-down form or cribbing, clamping devices comprising rod-receiving elements adapted to be embedded in the concrete, or the like, rods removably connected with said elements, reinforcing rod-embracing members connected with and extending from said rod-receiving elements so as to embrace said reinforcing rods, said removable rods having screw-threaded portions, screw-threaded clamping plates movably disposed upon the screw-threaded portions of said rods and adapted to be brought into clamped relation with the form or cribbing, and lock-nuts upon said rods.

In testimony, that I claim the invention set forth above I have hereunto set my hand this 8th day of February, 1918.

SAMUEL S. COLT.

Witnesses:
 FRED'K FRAENTZEL,
 FRED'K H. W. FRAENTZEL.